Aug. 21, 1956 G. M. GIBSON 2,759,348
LAUNDRY MACHINE
Filed June 12, 1950 11 Sheets-Sheet 1

INVENTOR.
George M. Gibson
BY
Charles L. Woodin
Agent.

Fig. 3.

INVENTOR.
George M. Gibson
BY
Charles K Woodin
Agent.

Aug. 21, 1956 — G. M. GIBSON — 2,759,348
LAUNDRY MACHINE
Filed June 12, 1950 — 11 Sheets-Sheet 4

INVENTOR.
George M. Gibson

Aug. 21, 1956 G. M. GIBSON 2,759,348
LAUNDRY MACHINE
Filed June 12, 1950 11 Sheets-Sheet 7

INVENTOR.
George M. Gibson
BY
Charles K. Woodin
Agent.

United States Patent Office 2,759,348
Patented Aug. 21, 1956

2,759,348

LAUNDRY MACHINE

George M. Gibson, Bellevue, Iowa

Application June 12, 1950, Serial No. 167,641

16 Claims. (Cl. 68—21)

This invention relates to domestic washing machines and particularly to a self-contained unitary type of washer wherein the entire home laundry job of washing, rinsing and wringing is done completely in the same machine without the use of extra tubs and equipment. This is a new type of domestic washer involving the use of a pressure squeezer and a complete washing, liquid dispensing and control system and which may be installed in a basement or kitchen without the need of special plumbing and electrical facilities.

It is one of the objects of the present invention to provide a low priced, high capacity complete domestic laundry unit for washing, rinsing and drying the clothes in a progressive washing cycle without the necessity for special facilities such as plumbing, heating and wiring. In other words, to provide a laundry unit that may be installed in an average basement or kitchen having conventional facilities.

Another object is to provide a complete domestic laundry unit wherein the entire working mechanism is mounted or suspended from a top frame member which is exposed as the finished top of the washer and on which there is also mounted all the manual controls and wherein the top frame and depending mechanism is readily accessible from underneath the cabinet. By bodily removal of the top it is easily possible to withdraw and to expose the complete mechanism for adjustment and service.

Another object is to provide a complete laundry unit wherein the entire laundry operation is manually controlled to provide a wide range of adjustments to facilitate the optimum use of the variable facilities that are available.

Another object of the present invention is to provide a fluid control system for washing machines whereby the washing fluids may be fed into the machine and utilized in the various steps of the washing process under full control of the operator by manually controlled levers in easy access to the operator.

A still further object is to provide a fluid control system for a washing machine wherein the washing fluids may be retained in the machine for reuse when the operator so desires.

And a still further object is to provide means whereby the operator may waste and discharge into the sewer such of the washing liquids that are no longer desired, and further, at the end of the washing the operator may completely drain the machine washing fluids into the sewer.

Other objects and benefits will be apparent from the following detailed description having reference to the accompanying drawings forming a part of this specification and in which.

Figure 1:
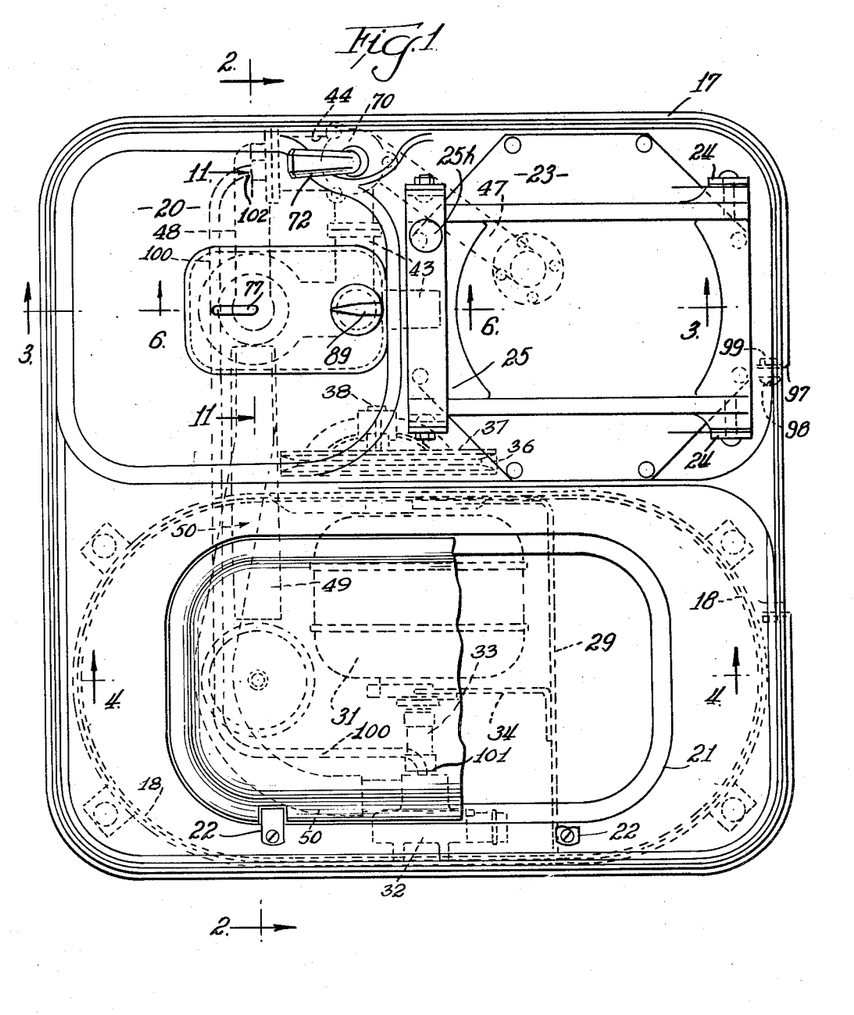
Fig. 1 is a top plan view of my washing machine.
Figure 2:
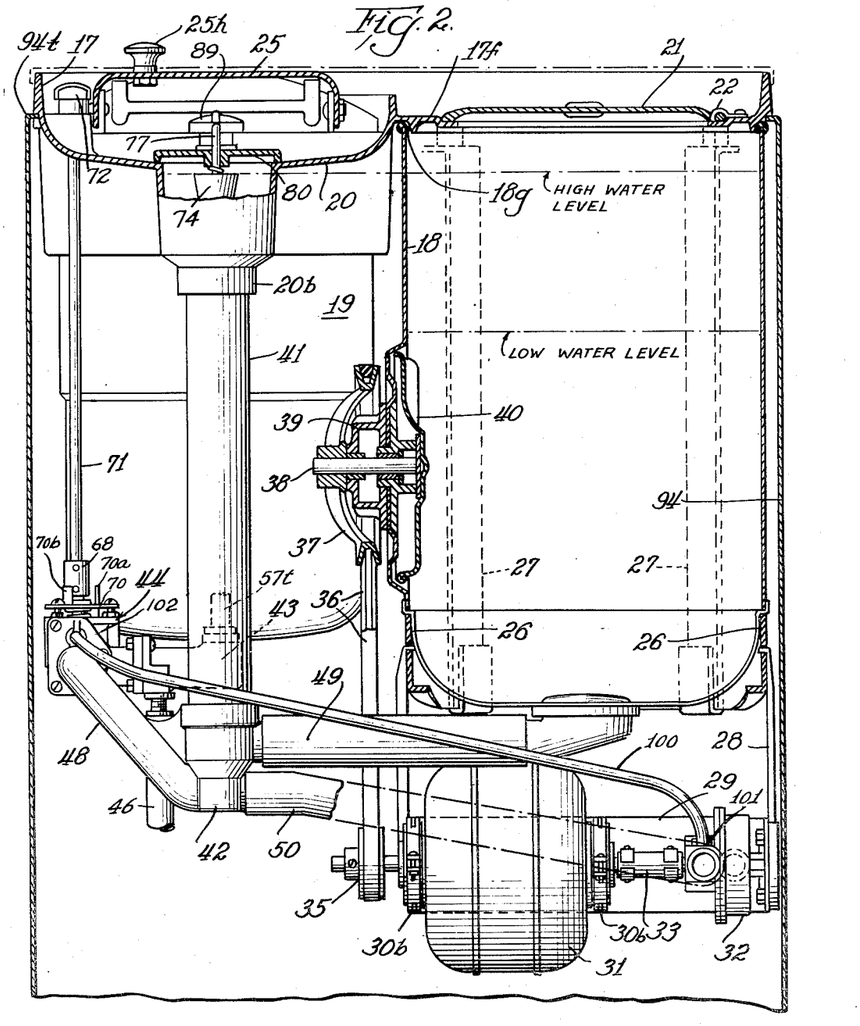
Fig. 2 is a fragmentary vertical cross sectional view of the washer shown in Fig. 1 as it would appear on the section line 2—2 of Fig. 1.
Figure 3:
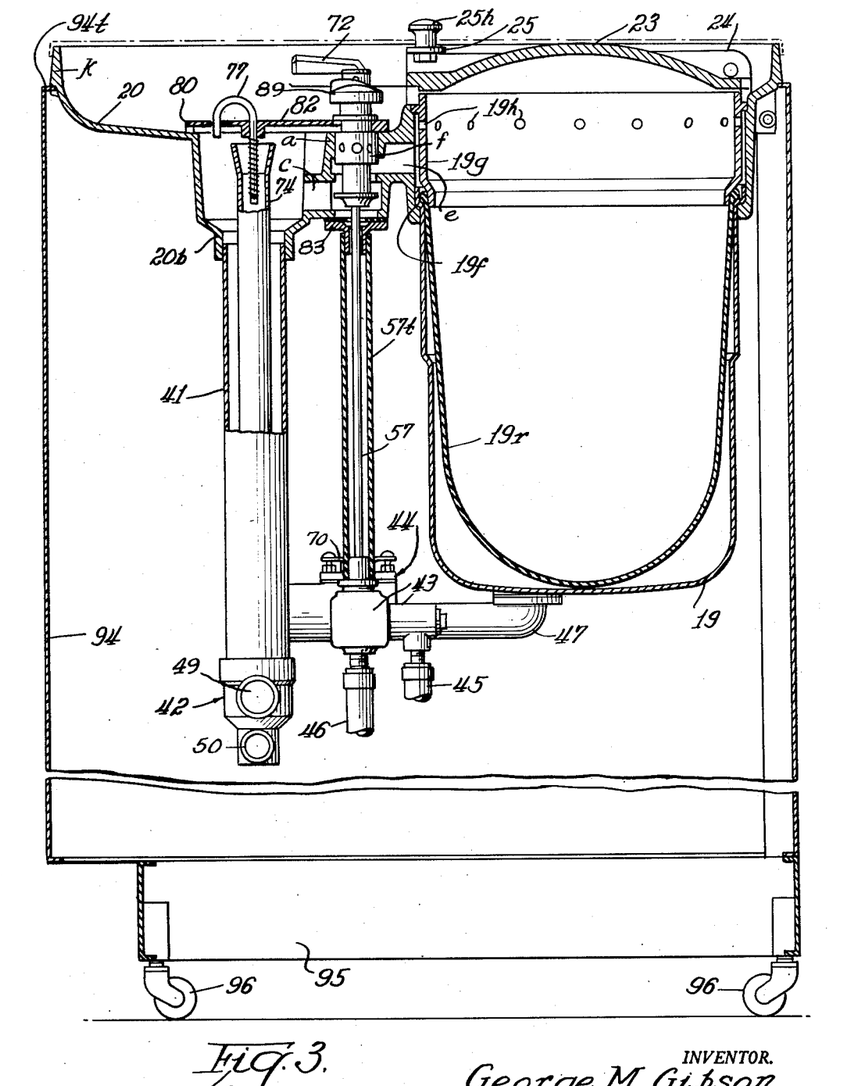
Fig. 3 is a vertical cross sectional view of the washing machine as it would appear on the section line 3—3 of Fig. 1.

Now referring to the drawings, and at the outset to Figs. 1, 2 and 3, I designate my top frame member by the numeral 17. The top frame 17 acts as an overflow water collecting unit having at least one low basin area to drain away the waste water. The integral frame member is preferably made of cast aluminum or as a stamping, and I propose to provide in this element a base on which I arrange and support my entire mechanism as a working unit. Although I designate the element 17 as the top frame, it could properly be called the base of my machine. It is in fact the base on which I build the machine. I actually place this top frame bottom side up and mount the mechanism firmly thereon. Thus the complete mechanism may be constructed, inspected and adjusted as a complete, finished unit without the surrounding cabinet. Likewise, the complete mechanism may be inspected and adjusted by removing the cabinet when the machine is in working condition.

On a flange 17-f of the frame I mount a tub 18 firmly on a rubber grommet 18-g surrounding the flange 17-f on the frame 17. Adjacent one side of the tub 18 I support a squeezer tank 19 on a flange 19-f supported on the frame 17. In this flange 19-f I support a rubber squeezer bag 19-r secured therein by a retainer ring 19-g having drain holes 19-h, a structure plainly illustrated in Fig. 3. At the side of the squeezer tank 19 I form a part of the frame 17 into a drain sump or overflow water basin 20, the purpose of which will later be explained. On the top of the frame 17 I provide a hinged lid 21 on hinges 22 over the tub 18. On top of the squeezer tank 19 I mount a hinged lid 23 having a stationary hinge 24 and a swingable bail clamp 25 operable through handle 25h as shown in Figs. 1, 2 and 3. From the above description it will be understood that I have arranged the cover 23 and a clamp 25 over the squeezer tank and bag mechanism 19 and 19–r whereby the wet clothes may be placed in the bag, the cover 23 fastened down by the clamp 25 and when the bag 19–r is compressed by surrounding water under pressure, the water in the clothes will be pressed out by contraction of the bag 19–r and the clothes will thus be dried.

Figure 4:
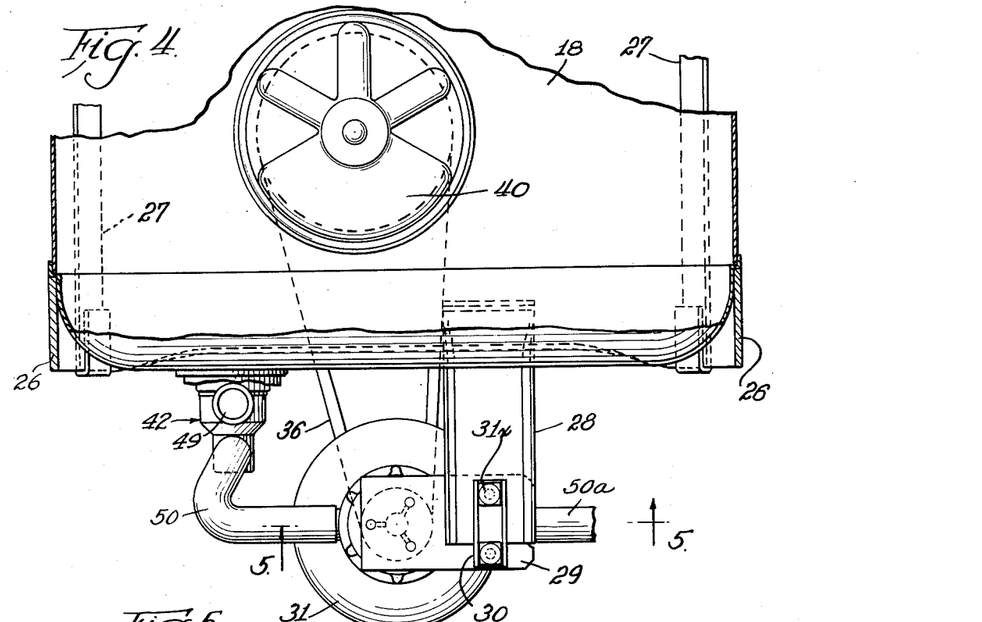
Fig. 4 is a fragmentary vertical cross sectional view of the washing machine showing the motor mount and belt drive as it would appear on the section line 4—4 of Fig. 1.

Now referring to the circular saddle 26 which supports the tub 18 under a lower bead as clearly shown in Figs. 2 and 4, the saddle 26 is supported by hanger straps 27 which clamp around the saddle 26 and are attached by bolting to bosses on the underside of the frame 17. Depending from the saddle 26 are hangers 28 which support a U base 29 by means of adjustment straps 30 fastened to the members by bolts 31x as clearly illustrated in Figs. 4 and 5. The U base 29 supports a motor 31 by one support end and by an additional support bracket 34 which are attached to the central hub of the motor by clamp brackets 30b as shown. This mounting supports the motor in conventional rubber mountings in a quiet and effective manner. On the other upright end of the base 29 is mounted a drain pump 32 by bolts as shown. The drain pump 32 is mounted in aligned position with the motor 31 and is connected with the motor by a flexible coupling 33. From this structure it will be understood that the motor is securely and flexibly mounted with the pump 32 in an adjustable manner through the assembled elements 28, 29, 30 and 30b as illustrated.

Figure 5:
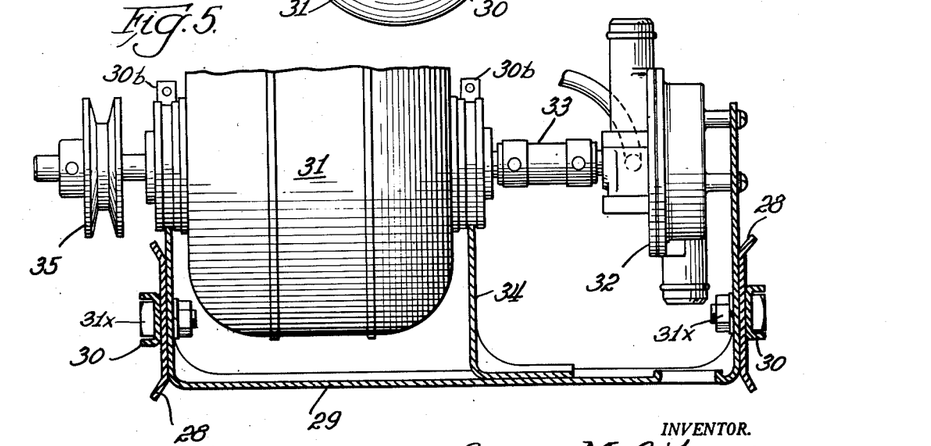
Fig. 5 is a fragmentary vertical cross sectional view of the motor mounting of the washer as the same would appear on the section line 5—5 of Fig. 4.

By reference to Fig. 5, it will be seen that when the nuts on the bracket 30 are loosened, the base 29 and the motor may be pivoted around the bolt 31x to give any desired tension on the belt. It will thus be understood that the motor mechanism as described is both flexibly and adjustably mounted.

Now referring to Figs. 2 and 4, it will be noted that on the shaft of the motor 31 there is mounted a drive pulley 35 connected with belt 36 for driving a driven pulley 37 mounted on a driven shaft 38 journalled within a sealing bracket 39 which shaft 38 connects with the dasher 40 located on the inside of the tub. From the above description it will be appreciated that the entire washing mechanism, including dasher, motor and drive belt, is mounted on the tub suspended from the top frame member 17. A washing machine with the dasher 40 on the side of the tub is completely described in my Patent No. 2,478,188 which clearly shows and explains a very effective washing mechanism which is utilized in this machine.

From the above descriptions it will be appreciated that I have associated in a convenient coacting manner a washing tub 18 with its complete mechanism and a complete extractor tank 19. These mechanisms are securely mounted in a suspended manner from the top frame 17 and both are completely accessible through lid members mounted on the top of the frame.

I will now describe the liquid control system by which I control the water to the tub, the water to the squeezer and the water from the squeezer, both expressed water and the pressure water used in the squeezer, and the manner in which the drain water is handled. At the outset I desire to explain that I use a central liquid control system which is built together in a unitary manner. Now referring to Figs. 2 and 3, in the drain sump 20 and its central boss 20–b I mount a hollow support tube 41 comprising a standpipe which supports a manifold casting 42 in a suitable manner. On the center manifold 42 I connect a squeezer branch manifold 44 and to it is connected an inlet manifold 43. On the inlet branch manifold 43 is mounted a hot water inlet 45 and a cold water inlet 46. On the squeezer manifold 44 is mounted a squeezer tank in and out connection 47 and a drain outlet 48. On the center manifold 42 is mounted a washer tub inlet and outlet connection 49 and a drain pump outlet 50.

Figure 13:
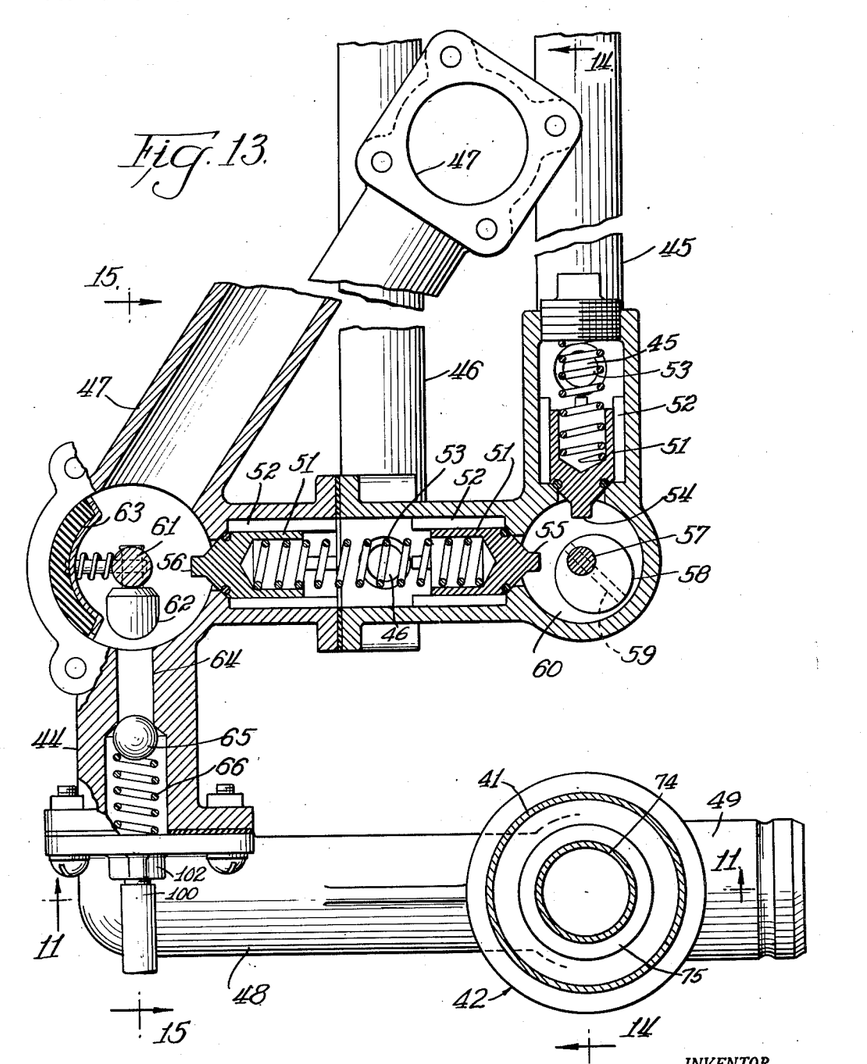
Fig. 13 is a horizontal cross sectional view of the valve mechanism as it would be seen along the section line 13—13 of Fig. 11.
Figure 14:
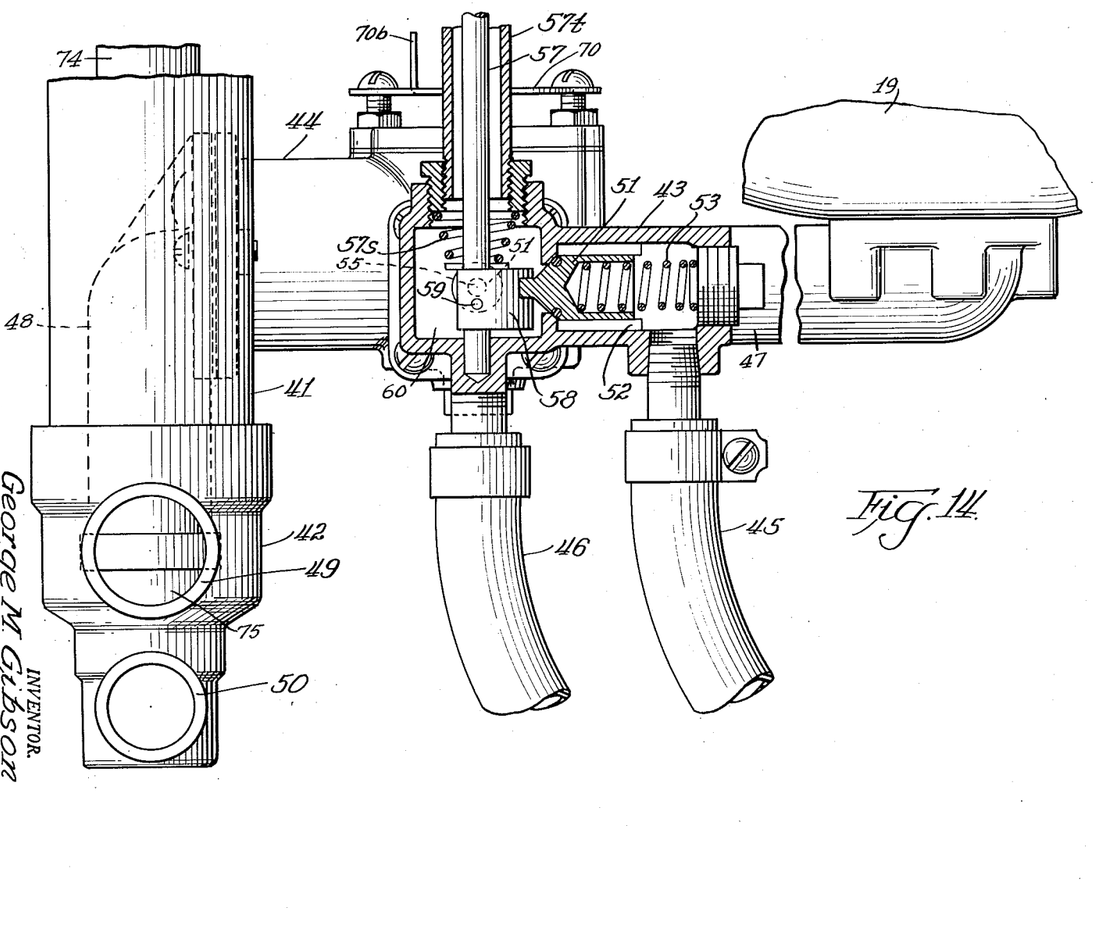
Fig. 14 is a vertical cross sectional view of the valve mechanism as the same appears substantially along the section line 14—14 of Fig. 13.

Now referring to Figs. 13 and 14, I will show how the inlet water is handled into the distribution manifolds. The cold water is carried through the hose 46 and the hot water through the hose 45, all attached to the manifold 43 previously described. As will be observed in Fig. 13, the manifold 43 is connected to the manifold 44 and in the conduit openings in these manifolds are mounted three spring retained poppet valves. It will describe the poppet valve adjacent the hot water inlet 45, which is typical of all three poppets and which will not be further described. A poppet valve 51 slidably mounted in a bearing 52 is spring retained by compression spring 53 in a seat as shown. On the forward end of the poppet valve 51 is a cam nose 54. The other two valves are the same except that I designate them by their cam noses 55 and 56.

In the manifold opening 60 of the manifold 43 is mounted a vertical valve operating rod 57 on which is mounted an operating cam 58 secured in proper operating position by a pin 59. The cam is positioned to engage the hot water valve cam 54 or the cold water valve cam 55 or by proper positioning of the cam a combination opening of both valves may be attained which will provide a resultant selected tempered hot water supply in the manifold opening 60. By observing Fig. 14, it will be noted that the valve rod 57 is retained in the opening 60 by a spring 57–s and it will be observed that the cam 58 is somewhat wide to permit vertical movement of the cam rod 57 for a purpose which will later be explained.

In the manifold 44 there is also mounted a valve operating rod 61 on which a valve cam 62 is mounted, together with a closure valve member 63. As illustrated in Fig. 13, the valve opens the drain passageway 48 but by a 90 degree closure movement, the valve cam 62 will actuate the cam nose 56 to permit water to enter the conduit 47 which connects with the squeezer tank 19 surrounding the squeezer bag, and the valve 63 will close the conduit 48 during the same movement. By this action the cold water supply can be permitted to enter the conduit 47 to collapse the squeezer bag for squeezing the clothes and water pressure may thus be exerted against the exterior of the squeezer bag for this purpose. However, should for any reason the cold water pressure entering the conduit 47 be excessive, I have provided a relief ball valve wherein the ball 65 retained by a set pressure spring 66 will relieve the excess pressure and guard the mechanism against any damage by such excess pressure.

Figures 15, 16:
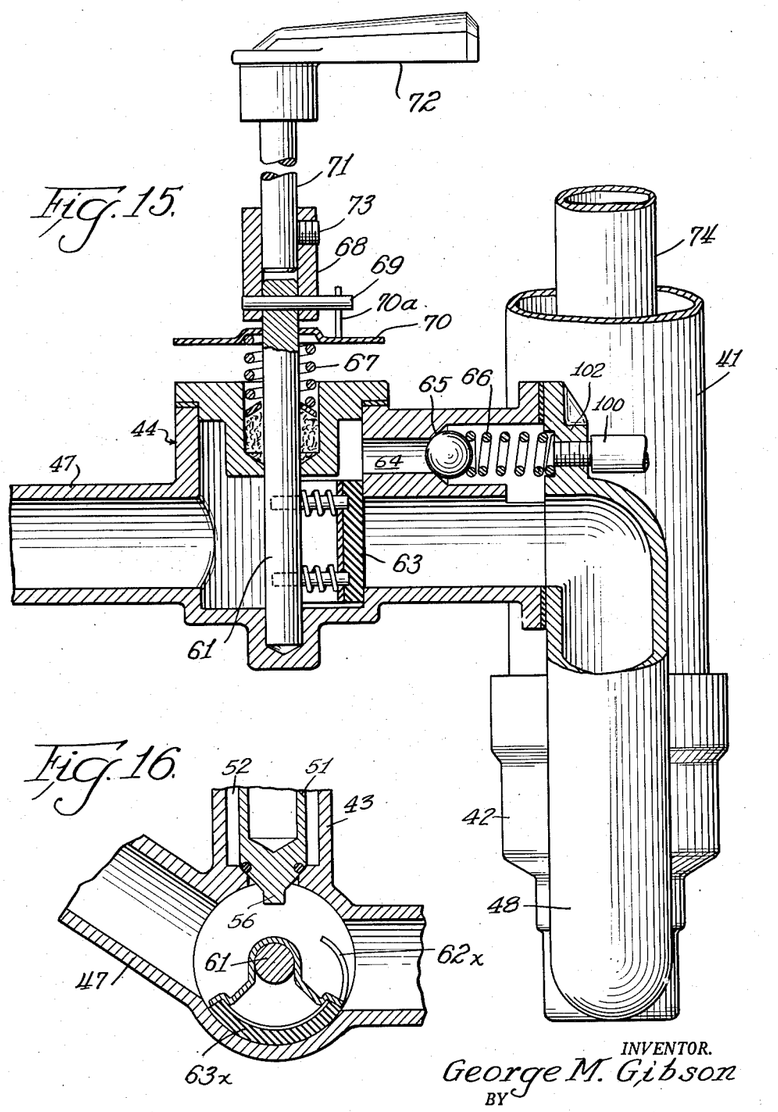
Fig. 15 is a vertical cross sectional view of the valve mechanism as it would appear when seen substantially along the section line 15—15 of Fig. 13.
Fig. 16 is a plan cross sectional view of the valve mechanism shown in Fig. 15, but introducing an optional valve structure as will later be explained.
Figure 17:
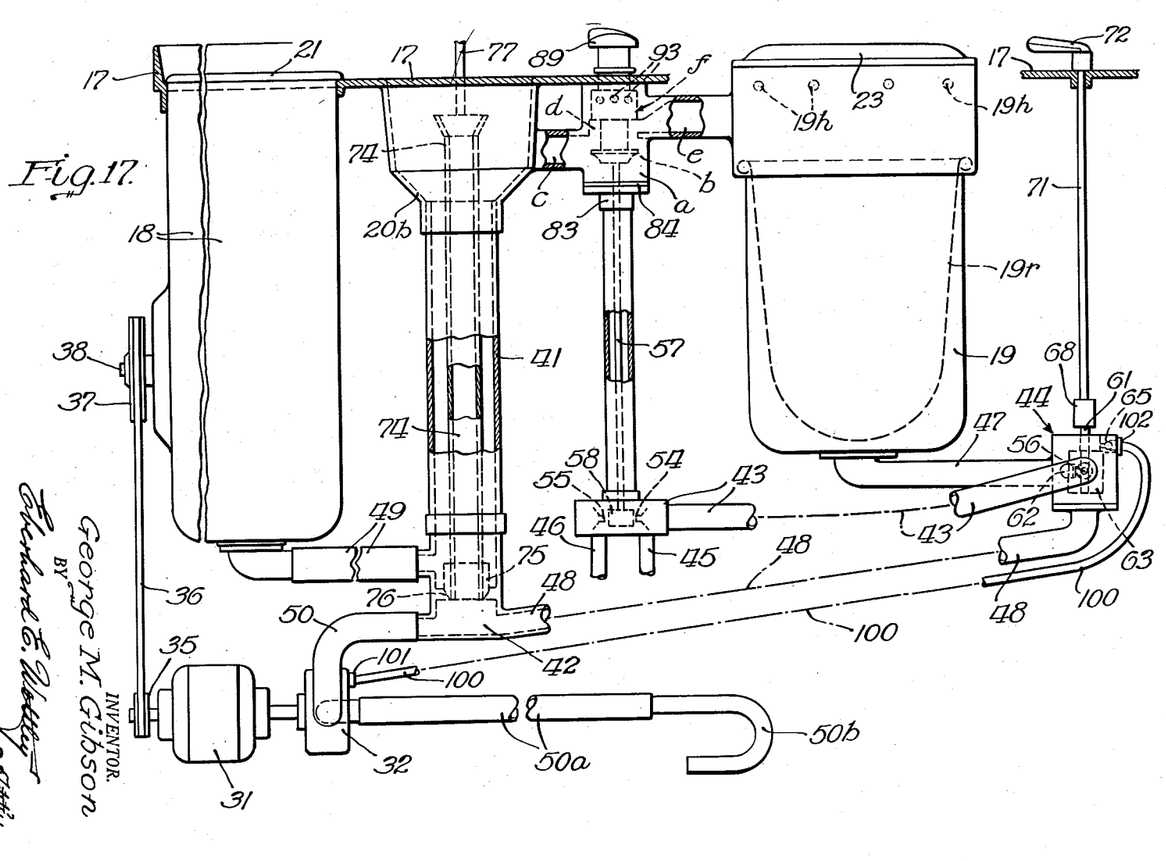
Fig. 17 is a diagrammatic illustration of a flow sheet arrangement of the operating units of the present invention and their connections as shown in their general cooperative relationships.

In Fig. 16 I have shown an optional form of valve 63–x formed from a single stamping wherein the tail of the stamping 62–x provides the cam for operating the cam nose 56. This is a somewhat simpler form and in many ways may be preferable to that shown in Fig. 13.

Now referring to Fig. 15, it will be noted that the valve shaft 61 is resiliently mounted in a valve bonnet by a spring 67, which abuts a valve stop 70 held by a pin 69 secured to the stem 61 and a coupling 68. The coupling 68 is attached to an additional handle shaft 71 carrying a handle 72 positioned in a given relation with respect to the coupling 68 by a set screw 73. By this arrangement, it will be understood that the position of the handle 72 may be fixed to align the valve closure 63 in any desired position.

Figures 11, 12:
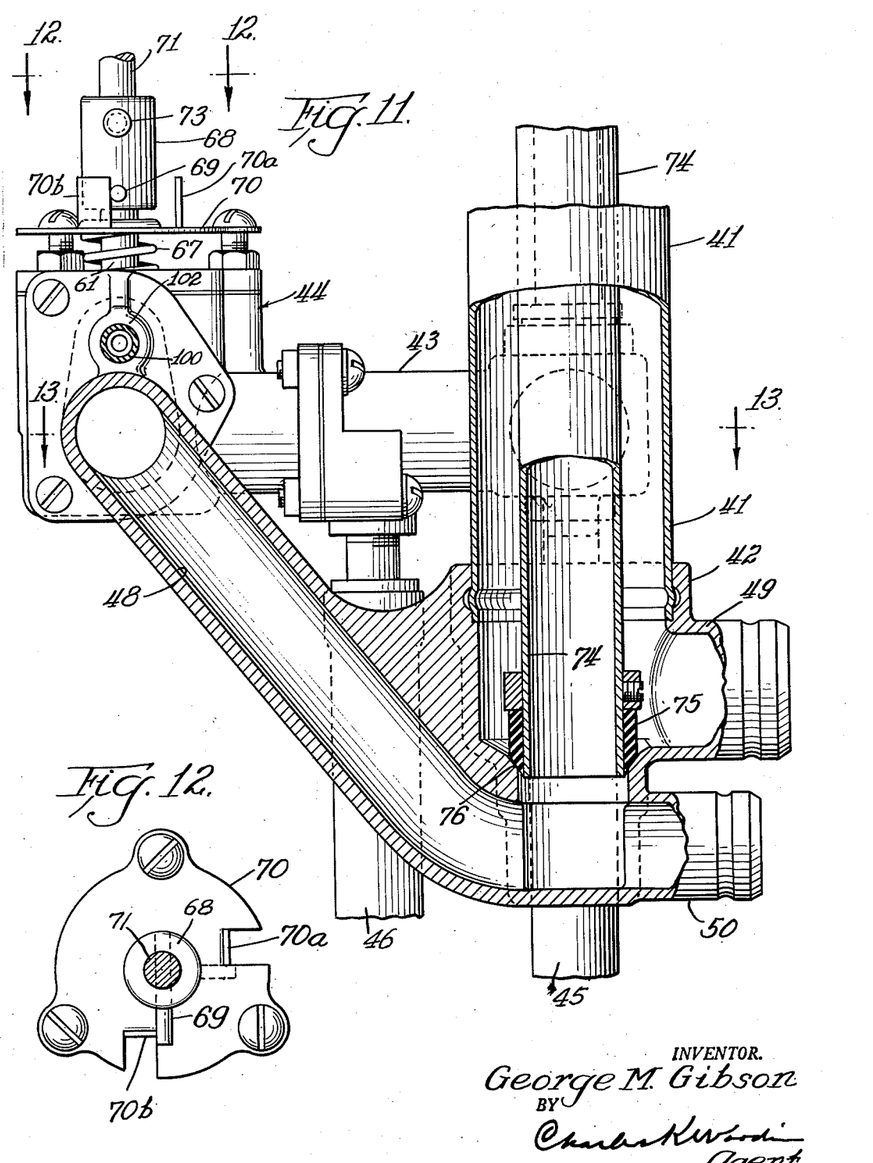
Fig. 11 is a vertical cross sectional view of a portion of the valve control mechanism as would appear on the section line 11—11 of Fig. 1 and Fig. 13.
Fig. 12 is a plan view of the valve control device as it would appear on the section line 12—12 of Fig. 11.

Now referring to Fig. 11, I will explain the outlet valve arrangement in the bottom of the central manifold 42. It will be noted that the outlet conduit 48 coming from the manifold 44 and the squeezer tank connection 47 leads downward to the bottom of the manifold 42 and outward through the outlet 50 to the drain pump 32. This is a direct outlet flow to the sewer and is the path of any waste water desired to be thus emptied. Near the junction of the outlet 50 is an upwardly directed opening which is normally closed by a valve 75 on an upright tube 74. When the valve is in the position illustrated in Fig. 11, all the water will go to the sewer because the only other outlet is through the top of the tube 74 which is at the highest waterline point of the machine. It will be understood that water entering or escaping through the tube 41 disposed about the tube 74 will be directed through the outlet 49 into the tub 18 and thus may be used to replenish the tub water supply. However, when the tube 74 is lifted to raise the valve 75 off of the valve seat 76, water entering through the tube 41 will be discharged into the sewer. It will thus be understood that water coming down the tube 41 may be made to re-enter the tub 18 or can be directed to the sewer as desired.

Figure 6:
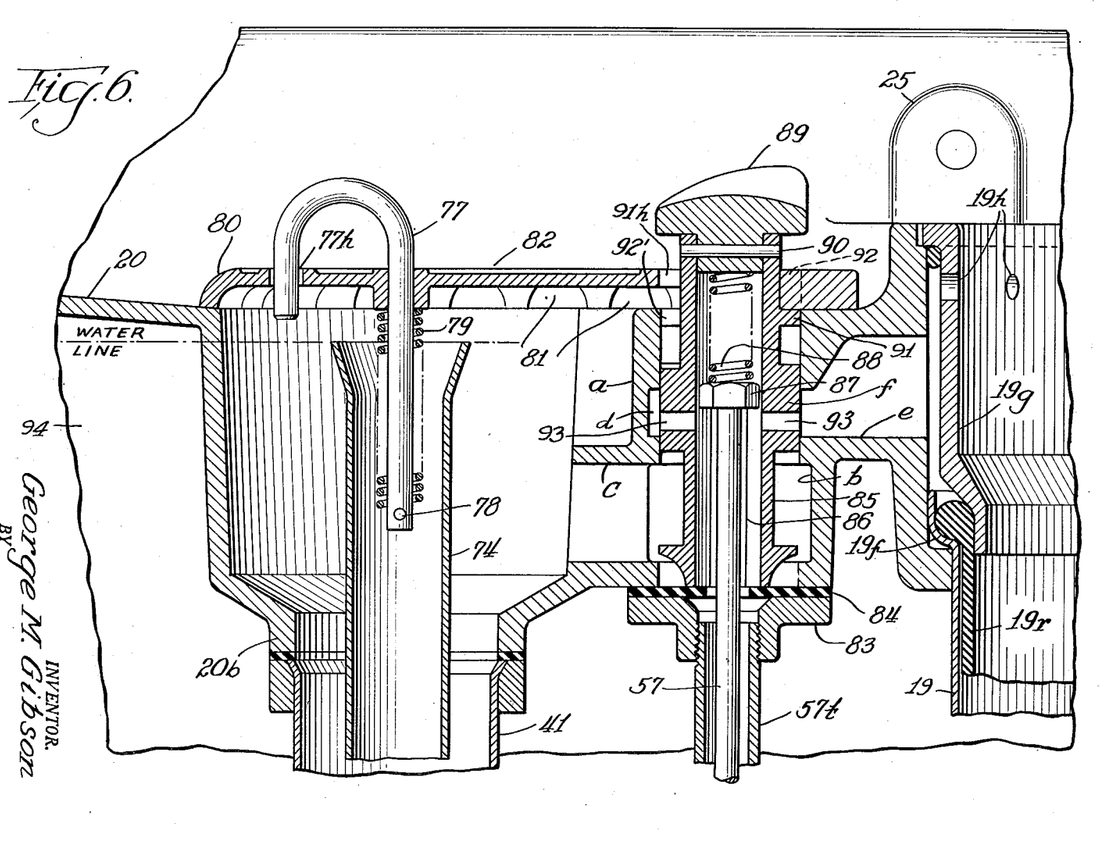
Fig. 6 is an enlarged vertical cross sectional view showing details of the valve control mechanism in lowered position as would appear on the section line 6—6 of Fig. 1.
Figure 7:
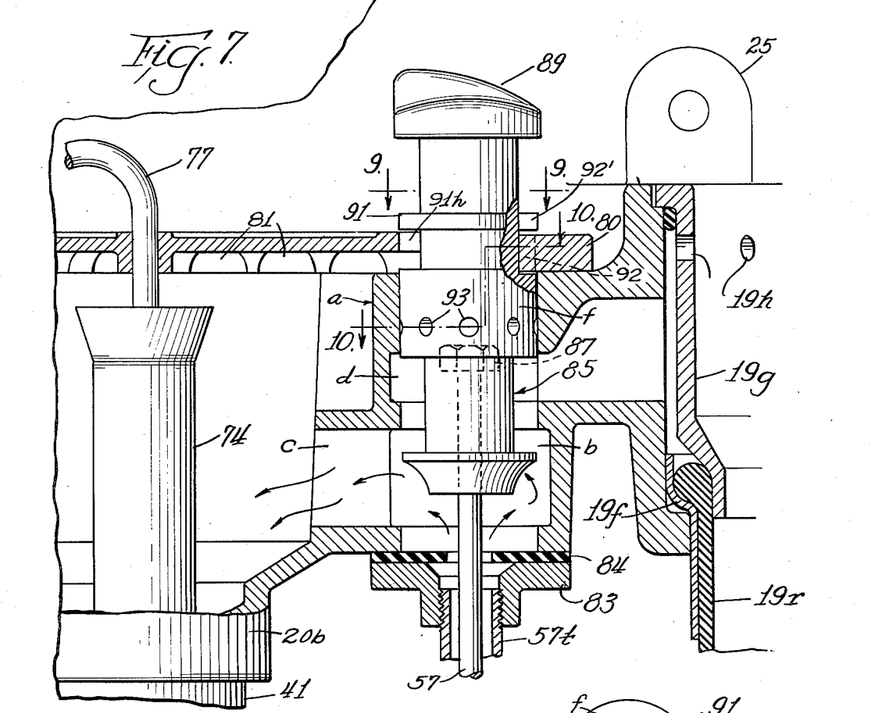
Fig. 7 is a similar cross sectional view of the same mechanism shown in Fig. 6 with the valve in raised position.
Figures 8, 9, 10:
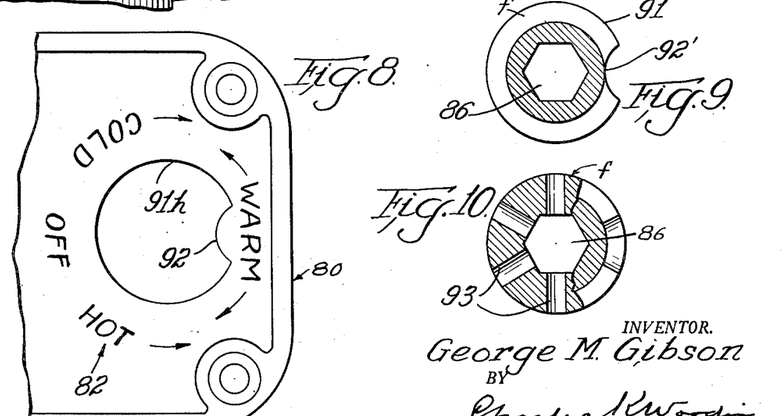
Fig. 8 is a fragmentary plan view of the valve cover plate per se shown in Fig. 7.
Fig. 9 is a plan cross sectional view of the valve body as it would appear on the section line 9—9 of Fig. 7.
Fig. 10 is a similar plan sectional view of the valve as it would appear on the section line 10—10 of Fig. 7.

Now referring to Figs. 6 to 10 inclusive, I will now explain some of the manual controls on the top of the frame 17. Referring at the outset to Fig. 6, it will be noted that the outer tube 41 is connected in a suitable manner to the boss 20–b in the sump 20. The interior tube 74, which has the closure valve 75 on its bottom, is guided and oriented by a U bolt 77 attached to the top of the tube 74 by a cross pin 78 as shown in Fig. 6. On top of the pin 78 is a compression spring 79 which secures the tube in releasible closed position. On top of the sump opening 20 there is a strainer casting 80 having scalloped edge openings 81 around its periphery to permit water to drain thereunder. The top of the casting 80 is provided with suitable indicia 82 as shown in Fig. 8 for the operating handle 89 shown in Fig. 7. With the tube 74 held in the position as illustrated in Fig. 6, it will be understood that the valve 75 is closed on the seat 76 as clearly shown in Fig. 11. It will be obvious, therefore, that any water entering in the boss 20b around the tube 74 will be communicated through tube 41 and the conduit 49 with the tub 18 as previously described. It will further be noted that the U bolt 77 extends through the casting 80 through a hole 77–h as shown in Fig. 6. By grasping the U bolt and raising the tube 74 and revolving the U bolt on top of plate 80, the top of the tube 74 will be lifted against the bottom of the strainer plate 80 and the valve 75 will be lifted off of the seat 76 to permit the water within the tube 41 to enter the drain 50 as clearly shown in Fig. 11. It will thus be understood that by manipulation of the U bolt 77, water may be selectively delivered either to the tube 18 or to the drain outlet 50 at the will of the operator.

Now referring to the valve mechanism adjacent the tube 74, the drain sump or overflow water basin 20 houses this main flow control valve mechanism which is arranged to be controlled by the same manipulating member 57 utilized to control the flow of hot and cold water to the washing and rinsing units. The main flow control valve structure includes a vertically positioned hollow valve housing a which may be integral with the sump 20 or a separate part. The valve housing a is provided with a lower chamber b which communicates with the sump 20b through a passageway c and has an open bottom which is closed by a fitting 83. A conduit 57t is connected with the bottom of the valve housing a and this conduit houses rod 57. A valve seat and gasket plate 84 having a central opening aligned with the conduit 57t is secured between the bottom of the housing a and fitting 83. The valve operating rod 57 extends through the conduit 57t, fitting 83 and plate 84 into the interior 86 of the housing a where it terminates in a hexagonal head 87.

The housing a is provided with an annular chamber d above the chamber b and is open to a passageway e which communicates with an annular chamber formed between the ring 19g and the cylindrical seat formed in the casting 17 to accommodate the extracting structure. The passageway e is below the openings 19h in the ring 19g which are above the upper end of the overflow conduit 74 as shown in Fig. 7.

A valve body F is slidably carried in the housing a and is formed with a hexagonal central passage slidably receiving the hexagonal head 87 on the valve shaft 57. The valve body f has the connected depending fitting 85 terminating in a seat and adapted to engage the valve plate 84 around the opening therein, see Fig. 6, to prevent water flowing upwardly through the conduit 57t from entering the lower chamber b. The valve body f is slidably and rotatably mounted in the housing a in water-sealing relation thereto above and below the annular chamber d and is provided with a plurality of radial bores 93 at the level of the chamber d opening into the central passage below the shaft head 87. The upper portion of the valve body f extends upwardly through an opening 91h in the plate 80 as seen in Fig. 8 and carries a manipulating handle 89 which seals the upper end of the central opening in the valve body and forms a seat for a compression spring 88. A pin 90 attaches the handle to the valve body. The spring 88 aids the spring 57s in seating the shaft 57 properly and biases the valve body to an upper position shown in Fig. 7.

The opening 91h in the casting 80 is circular except for a latching projection 92. A radial flange 91 surrounds the upper portion of the valve body and is provided with a segmental cut-out portion 92′ which is complemental to the projection 92 wherefore the flange 91 may be passed through the opening 91h when the cut-out therein is aligned with the projection 92. When the valve body is rotated from the aforesaid aligned position, the flange 91 cannot pass through the opening 91h and the valve is held in its lower or upper position. The projection 92 and cut-out 92′ in the flange 91 are so positioned that the valve must be rotated to a position in which the hot and cold water inlet valves 54 and 55 respectively are closed before the valve body can be raised or lowered. The length of the valve body is such that it bears tightly in sealing relation on the valving gasket plate 84 when maintained in the low position of Fig. 6. In this position the washer and extractor are cut off from each other and water admitted through the valves 54 and 55 by rotational movement of the handle 89, flows through tube 57t, chamber 86 and out through the bores 93 of valve body f into passageway e and then through holes 19h into the extractor to rinse clothes therein contained. When the valve is allowed to rise to the high position of Fig. 7 under the bias of the spring 88, the bores 93 are located within the chamber d and water flowing through the conduit 57 may flow into the boss 20b and out through the conduit 41 and tube 49 to the washer 18. The housing a provides a portion of a conduit system connected to the extractor and washer which is open when the valve body f is in the raised position; consequently, any water expelled from openings 19h in ring 19g from the clothing in the extractor also flows into the boss 20b from which it flows to the washer 18 if the valve 75 is seated or to waste if valve 75 is unseated.

To summarize, the main water inlet and flow control structure just described is connected to the washer and extractor and has a single control element which is manipulable to admit hot and cold water in any desired proportions and to supply such mixed water to the washer or the extractor and to open or close fluid communication between the washer and the extractor. The overflow drain through tube 74 maintains a maximum water level in the washer whether the washer water level is raised by the addition of clothing thereto or by water entering from the extractor or from the fresh water supply conduit 57t.

Now referring to Fig. 7, if the handle 89 is permitted to rise as shown with the flange 91 above the casting 80, then when the handle 89 is turned, water through the tube 57t may be made to enter into the sump and through the external tube 41 to replenish the water in the washer tank 18 as previously described, depending on the amount that the handle 89 is turned and being guided by the indicia 82 on the cover plate 80 as shown in Fig. 8. Water of any temperature may be made to flow into the tub at the will of the operator. Likewise, when the water is forced out of the squeezer bag 19–r and through the holes 19–h, this expelled water may be returned to the washer tub in the same manner. Likewise, if the expelled water is delivered to the sump 20 it will drain through the openings 81 in the edge of the casting 80 and into the tube 41 in the same manner. However, if the operator desires to discharge the water by elevating the handle formed by fitting 77 the water may be directed into the drain.

Now having in mind the description of the parts and their operation, I will now describe the method of operating my machine. Assuming that the machine has been installed properly and water and electrical connections have been made, the operator will first lift the tub lid 21 and with the handle 89 in upward position as shown in Fig. 7, and he will admit water into the tub through the manifold 60 and at the desired temperature, which may be checked by the operator's hand through the washer lid. The tub will then be filled with water at the proper temperature and a selected amount of soap or detergent can be introduced. The dasher 40 will now be set in motion by turning on the motor 31 to thoroughly dissolve the soap in the tub. Clothes will now be introduced through the lid 21 in the proper amount and the dasher operation is continued for a period of 3 to 5 minutes depending on how dirty the clothes may be. At the end of this period the clothes will now be transferred with a stick by sliding them out of the tub 18 into the squeezer bag 19–r by opening the lid 23 over the squeezer bag chamber, the squeezer bag obviously being arranged in very convenient position for this transfer. After the transfer has been made to the squeezer bag, additional clothes will then be placed in the washer tub 18 and the washing operation resumed. The squeezer lid 23 will now be closed by the bail handle 25h and pressure water can be introduced by turning the lever 72. The wash water squeezed out of the clothes will then be fed back through valve chamber a and into the tube 41 to the washer tub. When the squeezing operation is completed, valve 63 and cam 62 are rotated into the position shown in Fig. 13 by operating handle 72. The pressure water will then be forced out from between the bag 19r and tank 19 by the bag and clothes expansion causing the water to be directed through pipe 47 and through the manifold 44 into pipe 48 and on to the drain connection 50. Handle 89 will now be placed in the position shown in Fig. 6 and rinsing water will be introduced into the squeezer bag 19r through the holes 93 and 19h of any desired temperature. Usually I prefer a warm rinse. After rinsing, the lid 23 can be opened so that the clothes in the bag 19r may be stomped around with a stick in order to perform a slight rinsing operation. The lid 23 will again be closed with the bail lock 25 and again the handle 72 will be operated to again squeeze out the rinse water. In this case I may permit the warm rinse to be again delivered to the tub 18 by leaving the handle 89 in down position and thus rinsing water may be re-diverted into the tub 18 to replenish tub water with water which normally would have been wasted in the damp clothes. However, if a cold rinse is desired, the handle 89 may be turned according to the legends on the plate 82 and this rinse water may be wasted to the drain by subsequently raising valve body f until the annular recess about the same straddles the thickend portion of the casting 80 shown at the right of Fig. 7. This places the valve body in a vertical position to bypass rinse water from cavity e around valve portion 85 and through c into 41 under the squeezing action of the bag 19r. Now the second batch of clothes which have been in the tub from 3 to 5 minutes are again ready for the rinsing operation and the washing will proceed in the manner described. From this description it will be observed that the entire control of the machine is by manual handles on the top frame in easy access to the operator.

Now in the foregoing descriptions it will be observed that the entire mechanism of the machine has been mounted on the top frame 17. In order to make a complete commercial washing machine, it is necessary to surround this mechanism with a cabinet and in order to do this I provide a wrap around cabinet shell 94 mounted on a "set in" base 95 as clearly shown in Fig. 3. The wrap around cabinet 94 has an inwardly directed top flange 94t seen in Figs. 2 and 3 as underlying a peripheral flange k on the frame 17 to support the frame 17. The flange 94t engages in milled slots in the corners of the frame 17 beneath the flange k to prevent relative vertical movement of the frame 17 with respect to the cabinet 94. The ends of the cabinet 94 terminate in spaced relation at the rear of the machine and are angularly bent to provide facing flanges 97, see Figs. 1 and 3. The casting 17 is provided with bolting bosses 98 on its rear side below the flange k. Through bolts 99 extend through the bosses 98 and matching holes in the facing flanges 97. Suitable nuts are threaded onto the ends of the bolts 99 and are tightened to draw the flanges 97 against the bosses 99 under tension which seats the flange 94t tightly against the casting 17. However, this panel may be removed and easy access had to the mechanism of the machine through the opening thus provided. However, if desired, the entire cabinet 94 may be removed and the machine working mechanism and the latter may be placed upside down on its top frame 17 so that the entire mechanism is clearly exposed. From the above description it will be understood that I have provided a washing machine having a top frame which is utilized as a base and supports the entire mechanism, including the manual handles for operating the machine.

It will be observed and appreciated that my hydraulic system is connected for discharge to waste with a centrifugal pump 32 that is directly connected with the motor 31. The discharge line from the pump 32 expels the water through the usual flexible hose 50a connected with a discharge hook member 50b that may be placed for communication with the tub 18, or over the usual stationary laundry tubs or the tube assembly may be placed on the floor to discharge to a floor drain if desired. However, in the operation of the hydraulic system it will be understood that the water to the pump is supplied with an intermittent flow through a control system which has been explained. In the operation of this device, serious difficulties were experienced on account of air lock in the pump created whenever the hose 50a and hook 50b are used in an elevated position above the pump level which relationship effectively stops the water flow to waste through the pump. In fact, this air lock was so effective that it appeared that there had been a concealed valve which completely shut off the flow through the pump. The difficulty was due to entrapped air as an air bubble in the pump which had the above described effect. This difficulty was overcome by an effective air unloader pipe 100 leading from the pump 32 to the manifold 44 and which eliminated the air in the locked pump 32 permitting the pump to operate at its usual efficiency.

This was accomplished by a bleeder pipe 100 being suitably connected to the top portion of the pump housing at 101 and inclined upwardly to a liquid conduit fitting connection 102 that is located at the high point of the conduit system best illustrated in Figs. 1, 2, 11 and 15. This arrangement effectively unloads the air in the pump and permits the pump to perform its usual functions at which time the unloading pipe 100 is completely stopped off and the pump functions with complete efficiency. It was found that only a slight discharge of trapped air out of the housing of pump 32 would cause the pump to function properly even though the air could again be drawn into the pump intake but accompanied by water.

In the foregoing descriptions and drawings, I have well illustrated the combination extractor-rinser in my machine. Thus I have illustrated and described a well known principle of introducing rinse water after the wash water has been extracted. With the extractor-rinser herein employed it is possible to obtain a compressed fabric that has a sponge-like action as it expands to be saturated with rinse water. In my application of that principle within the extractor-rinser, I control the compression and expansion of the fabric with rinsing in a new and effective manner under full control of the operator.

Although I have described a bag type squeezer-extractor, rinser, I do not desire to be limited to this bag type extractor, and it will be understood that I include the principle of the centrifugal spinner extraction type as well as the common roll wringer. My description of a bag type squeezer-extractor-rinser is meant to include all types of extractor-rinsers wherein I control the rinsing operation through a water supply hydraulic conduit system as has been explained above.

Having thus described my invention, I now claim as new:

1. In a laundering apparatus, a washer, a combination clothes handling extractor and rinser unit, conduit mechanism connecting said washer and said unit, hot and cold water supply lines each individually connected directly with said conduit mechanism, and flow control means for said conduit mechanism comprising a first valve means for operating said hot and cold water supply lines to selectively direct hot and/or cold water from said supply lines into said conduit mechanism, and a second fluid control valve connected with said conduit mechanism to divert expressed water from clothing carried within said extractor and rinser unit into said washer, and an overflow drain member connected with said conduit mechanism and interposed between the washer and said flow control means to establish a predetermined maximum liquid level control for said washer.

2. In a laundering apparatus, a washer, a combination clothes handling extractor and rinser unit, conduit mechanism connecting said washer and said unit, hot and cold water supply lines each individually connected directly with said conduit mechanism, and flow control means for said conduit mechanism comprising a first valve means for operating said hot and cold water supply lines to selectively direct hot and/or cold water from said supply lines into said conduit mechanism, and a second fluid control valve connected with said conduit mechanism to divert expressed water from clothing carried within said extractor and rinser unit into said washer, and a shiftable gravity controlled overflow drain member connected with said conduit mechanism and constructed and arranged to establish a predetermined maximum liquid level in said washer, a drain pipe connected with said conduit mechanism to drain said washer therethrough, said overflow drain member normally having communication with said drain pipe when at rest, and a valve connected with said overflow drain member and arranged to discharge washer water from said conduit mechanism into said drain pipe as said drain member is shifted.

3. In a laundering apparatus, a washer, a combination clothes handling extractor and rinser unit, conduit mechanism connecting said washer and said unit, hot and cold water supply lines each individually connected directly with said conduit mechanism, and flow control means for said conduit mechanism comprising a first valve means for operating said hot and cold water supply lines to selectively direct hot and/or cold water from said supply lines into said conduit mechanism, and a second fluid control valve connected with said conduit mechanism to divert expressed water from clothing carried within said extractor and rinser unit into said washer, said first valve means comprising cooperatively arranged individual spring pressed valve members to normally interrupt water flow from said supply lines into said conduit mechanism, and a single cam means constructed and arranged to individually and/or collectively operate said spring pressed valve members to provide a water flow of a selected temperature to said conduit mechanism.

4. In a clothes washing machine, a clothes washing tub, a combination rinser and water operated wash water extractor for the clothes, and a water system to supply water to the aforesaid units and to operate the same comprising a water supply manifold, hot and cold water supply pipes connected with said manifold, a first water conduit means having connection with the rinser portion of said rinser-extractor, a second water conduit means having connection with said extractor portion of said rinser-extractor to operate the latter and including a drain duct, said first conduit means including a connection with said washing tub and a bypass to said drain tube, and cooperative valve mechanisms in said water system to regulate the water distribution in said system comprising dual valve mechanism to selectively control water flow from said hot and cold water supply lines into said manifold and into the first conduit means, and to optionally divert the flow of water from said first conduit means to said rinser or washing tub respectively, a second valve mechanism to selectively connect said manifold with said extractor or to connect the extractor with said drain pipe, and a third valve to selectively open said bypass to connect said tub with said drain duct.

5. In a laundering apparatus having a washing receptacle and a combination accessory unit consisting of rinsing and extracting receptacles associated with said washing receptacle, the combination of a fluid distributor having hot and cold water supply lines connected therewith, conduit means directly connecting said distributor with each of said receptacles respectively, a waste drain connected with said conduit means and adapted to drain waste water from any one of said receptacles, a first control valve means for said fluid distributor constructed and arranged for selectively directing hot and/or cold water into either of the washing or rinsing receptacles, a second valve means arranged to bypass hot and/or cold water from said fluid distributor into said extracting receptacle and to divert water from said extracting receptacle into said drain, and a third valve means interposed between said washing and rinsing conduit means and said waste drain, said third valve means being constructed and arranged either to connect both of said washing and rinsing receptacles together to replenish the wash water in said washing receptacle with rinse water or to connect said washing and rinsing receptacles with the waste drain.

6. In a washing machine having washing, rinsing and drying units, a single unitary washing fluid supply apparatus carried by said units as an integral part thereof, said apparatus comprising a fluid distributing manifold provided with joined conduit means interconnected with each of said units respectively, hot and cold water lines connected with said manifold and arranged to receive hot and cold water from a remote external supply source, a fluid drain structure arranged for communication with each of said three units through said joined conduit means, a single dual control valve mechanism constructed and arranged to regulate the hot and cold water supply into said manifold and simultaneously to selectively direct said water into one or both of said washing and rinsing units, said same control valve mechanism having operable means constructed and arranged to communicably connect said washing and rinsing units, and other independent valving means in said apparatus to selectively connect said units with said fluid drain structure.

7. In laundering apparatus having a washer unit, and an extractor-rinser unit associated therewith, a fluid handling system for said units comprising a fluid distribution manifold connected with said units, hot and cold water supply lines connected with said manifold, cooperating valve mechanism having a first valving means to selectively admit hot and/or cold water to said units from said manifold, conduit means connecting said units, said valve mechanism having a second valving means to selectively bypass water from one of said units to the other thereof, a waste drain structure connected with said conduit means, and a drain valve to connect said conduit means with said drain structure for emptying said units, said waste drain structure being connected with the lower limits of said conduit means and below the bottom water levels of said units, and said conduit means including a standpipe extending from said waste drain structure to a location above the maximum high water level of said units, and said drain valve comprising a tubular means disposed within said standpipe and having an annular valve at its bottom engaging a valve seat connected with said standpipe to close off water flow to said waste drain from said standpipe and associated conduit means with the interior of said tubular means open to said waste drain structure, and said tubular means having the open top thereof located within said standpipe and terminating at an elevation coincident with the normal maximum high water level of said units to provide automatic overflow means to said waste drain structure to prevent the water level in said machine from exceeding the predetermined selected maximum level.

8. In a washing machine, a tub unit, an extractor-rinser unit, a water drain basin associated with a water collecting work surface disposed to surround the open ends of said units, and a fluid system for said units comprising a standpipe connected with said drain basin to receive overflow water therefrom and having its lower end terminating beneath the lower fluid level confines of said units, a conduit connecting said standpipe with said tub unit, a waste water discharge drain line disposed adjacent the lower end of said standpipe, said standpipe having a water discharge drain port communicating with said drain line and a valve seat at said port, and a lift valve mechanism to open and close said port, said valve mechanism when open providing means to drain water out of said standpipe and the connected tub unit and when seated or closed providing means to confine water flow between said standpipe and tub unit, and said lift valve mechanism comprising a valve to engage said port valve seat and a hollow tube to carry said valve, said tube being disposed within said standpipe and arranged for direct communication with said drain line through said standpipe drain port while said valve is closed, and said hollow tube being of a predetermined height with respect to said standpipe to provide an overflow means to automatically establish a selected maximum high water level for said fluid system.

9. In the combination according to claim 8 wherein actuating means is connected with said valve tube to move the latter between valve open and valve closed positions, and spring means carried by said actuating means to normally bias said tube and its valve into closed position against the valve seat of said drain port.

10. In a washing machine, a tub, a clothes rinsing unit including a bag, a pressure chamber surrounding said bag, and a fluid system associated with the aforesaid mechanisms to carry out the washing operation comprising a drain pipe connected with said tub and extending to an elevated position adjacent said rinsing unit, a hot and cold water supply conduit connected with a valve housing interposed between said drain pipe and said rinser unit and having port connections with each of the latter, and a control valve in said housing adapted for coactive operation between said supply conduit and said ports to said drain pipe and rinser unit, said control valve being endwise movable in said valve housing between raised and lowered positions and comprising a hollow dead end body having radial ducts leading outwardly therefrom, an apertured gasket connected between said supply conduit and said housing, said valve body when disposed in lowered position being arranged to endwise abut said gasket with its open end about said gasket aperture to divert supply water through said body and out of the ducts therein, said rinser unit port being arranged for alignment with said valve body ducts with said body in lowered position to direct supply water into said rinser unit and the bag while said drain pipe port is closed off by said valve body, and said valve body when disposed in raised position functioning to displace said ducts out of alignment with said rinser unit port to be cut off by said valve housing while simultaneously opening the gasket aperture, said drain pipe port being located adjacent the lower end of said housing at said gasket location to receive water flow from said water supply conduit for diversion through said drain pipe port into said drain pipe and into said tub.

11. In the combination according to claim 10 wherein said control valve is rotationally carried within said valve housing, said hot and cold water supply conduit includes a mixing valve means operable to cut off or to regulate the mixture of hot and cold water delivered to said valve housing, and actuating mechanism connected with said control valve and with said mixing valve means to regulate the latter in response to the turning movements of said control valve.

12. In a washing machine, a tub, a clothes rinsing unit including a bag, a pressure chamber surrounding said bag, and a fluid system associated with the aforesaid mechanisms to carry out the washing operation comprising a drain pipe connected with said tub and extending to an elevated position adjacent said rinsing unit, a hot and cold water supply conduit connected with a valve housing interposed between said drain pipe and said rinser unit and having port connections with each of the latter, and a control valve in said housing adapted for coactive operation between said supply conduit and said ports to said drain pipe and rinser unit, said control valve being endwise movable in said valve housing between raised and lowered positions and comprising a hollow dead end body having radial ducts leading outwardly therefrom, an apertured gasket connected between said supply conduit and said housing, said valve body when disposed in lowered position being arranged to endwise abut said gasket with its open end about said gasket aperture to divert supply water through said body and out of the ducts therein, said rinser unit port being arranged for alignment with said valve body ducts with said body in lowered position to direct supply water into said rinser unit and the bag while said drain pipe port is closed off by said valve body, and said valve body when disposed in raised position functioning to displace said ducts out of alignment with said rinser unit port to be cut off by said valve housing while simultaneously opening the gasket aperture, said drain pipe port being located adjacent the lower end of said housing at said gasket location to receive water flow from said water supply conduit for diversion through said drain pipe port into said drain pipe and into said tub, and said valve body having an external recess portion thereon to provide communication between said rinser unit port and said drain pipe port when said valve is disposed in said raised position.

13. In the combination according to claim 12 wherein said valve body contains an upwardly and outwardly flared portion adjacent the open end of said hollow body to normally deflect inlet supply water from said supply conduit away from said rinser unit port and to discharge said water through said drain pipe port into said pipe when the valve body is in raised position.

14. In a washing machine, a tub, a clothes rinsing unit including a bag, a pressure chamber surrounding said bag, and a fluid system associated with the aforesaid mechanisms to carry out the washing operation comprising a drain pipe connected with said tub and extending to an elevated position adjacent said rinsing unit, a hot and cold water supply conduit connected with a valve housing interposed between said drain pipe and said rinser unit and having port connections with each of the latter, and a control valve in said housing adapted for coactive operation between said supply conduit and said ports to said drain pipe and rinser unit, said control valve being endwise movable in said valve housing between raised and lowered positions and comprising a hollow dead end body having radial ducts leading outwardly therefrom, an apertured gasket connected between said supply conduit and said housing, said valve body when disposed in lowered position being arranged to endwise abut said gasket with its open end about said gasket aperture to divert supply water through said body and out of the ducts therein, said rinser unit port being arranged for alignment with said valve body ducts with said body in lowered position to direct supply water into said rinser unit and the bag while said drain pipe port is closed off by said valve body, and said valve body when disposed in raised position functioning to displace said ducts out of alignment with said rinser unit port to be cut off by said valve housing while simultaneously opening the gasket aperture, said drain pipe port being located adjacent the lower end of said housing at said gasket location to receive water flow from said water supply conduit for diversion through said drain pipe port into said drain pipe and into said tub, said control valve being rotationally carried within said valve housing, a water mixing valve means operable to cut off or regulate the water supply in said hot and cold water supply conduit, and actuating mechanism connected with said mixing valve means and with said control valve whereby rotation of said control valve functions to operate said mixing valve means, and an auxiliary water system to supply water under pressure to said pressure chamber and about said rinser bag comprising a water inlet line connected with said mixing valve means and with a diversion manifold communicating with said pressure chamber, a waste water line connected with said diversion manifold to discharge waste water from said pressure chamber, and a water channelling valve mechanism for said diversion manifold to selectively direct water from said water supply conduit mixing valve means into said pressure chamber or to cut off said water supply and to direct water from said pressure chamber into said waste water line.

15. In the combination according to claim 14 wherein said drain pipe includes a water outlet bypass connected with said waste water line, and a closure member to open and close said water outlet bypass.

16. In the combination according to claim 15 wherein said closure member comprises an annular valve and a central tube supporting said valve, said tube extending to a predetermined height in said drain pipe to establish an overflow member for said fluid system having direct communication with said waste water line while said closure member is normally in position to close off water flow from said drain pipe to said waste drain line.

References Cited in the file of this patent

UNITED STATES PATENTS

| | | |
|---|---|---|
| 1,806,289 | Getz | May 19, 1931 |
| 1,932,246 | Kirby | Oct. 24, 1933 |
| 1,968,638 | Ducker | July 31, 1934 |
| 1,996,505 | Ducker | Apr. 2, 1935 |
| 2,049,057 | Geldhof | July 28, 1936 |
| 2,093,589 | Geldhof | Sept. 21, 1937 |
| 2,154,566 | Frantz et al. | Apr. 18, 1939 |
| 2,230,771 | Wiltshire | Feb. 4, 1941 |
| 2,335,560 | Crane | Nov. 30, 1943 |
| 2,421,252 | Dunham | May 27, 1947 |
| 2,431,246 | Hallanan | Nov. 18, 1947 |
| 2,498,179 | Oliver | Feb. 21, 1950 |

FOREIGN PATENTS

| | | |
|---|---|---|
| 490,691 | Great Britain | Aug. 19, 1938 |